United States Patent
Apte et al.

[11] Patent Number: 5,854,705
[45] Date of Patent: Dec. 29, 1998

[54] MICROPOSITIONED LASER SOURCE FOR RASTER OUTPUT SCANNERS

[75] Inventors: Raj B. Apte, Palo Alto; Thomas L. Paoli, Los Altos; Patrick Y. Maeda, Mountain View; Tibor Fisli, Los Altos Hills, all of Calif.

[73] Assignee: Xerox Corporation, Stamford, Conn.

[21] Appl. No.: 785,229

[22] Filed: Jan. 17, 1997

[51] Int. Cl.⁶ ..................................... G02B 26/08
[52] U.S. Cl. .................... 359/196; 359/201; 359/212; 359/216; 385/83; 385/88; 362/271
[58] Field of Search ................... 359/196–199, 359/201–202, 390–392, 212–219, 900; 385/88.83; 362/259, 269, 271, 277, 282, 284, 384

[56] References Cited

U.S. PATENT DOCUMENTS

| | | |
|---|---|---|
| 4,474,422 | 10/1984 | Kitamura . |
| 4,578,688 | 3/1986 | Okuno . |
| 4,591,903 | 5/1986 | Kawamura et al. . |
| 4,644,160 | 2/1987 | Arimoto et al. . |
| 4,714,309 | 12/1987 | Woodcock et al. ............ 359/15 |
| 4,784,454 | 11/1988 | Dyott ............................ 385/88 |
| 4,841,137 | 6/1989 | Mochizuki et al. . |
| 4,847,642 | 7/1989 | Murayama et al. . |
| 4,903,067 | 2/1990 | Murayama et al. . |
| 4,962,312 | 10/1990 | Matuura et al. . |
| 5,025,346 | 6/1991 | Tang et al. . |
| 5,200,766 | 4/1993 | Iwasaki . |
| 5,243,359 | 9/1993 | Fisli . |
| 5,341,158 | 8/1994 | Appel et al. . |
| 5,343,224 | 8/1994 | Paoli . |
| 5,371,526 | 12/1994 | Appel et al. . |
| 5,403,665 | 4/1995 | Alley et al. . |
| 5,563,647 | 10/1996 | Fisli . |

FOREIGN PATENT DOCUMENTS

| | | |
|---|---|---|
| 0 734 154 A2 | 9/1996 | European Pat. Off. . |
| 02 089662 A | 3/1990 | Japan . |

*Primary Examiner*—James Phan
*Attorney, Agent, or Firm*—Oliff & Berridge, PLC

[57] ABSTRACT

In a raster output scanner (ROS) of a xerographic printing device, the location of an apparent source of the light beam is adjusted within a light emitting apparatus to enable spot position control anywhere along a scanline to insure subline registration of an image. This is accomplished by placing the apparent source location of the light emitting apparatus on a movable plate. The apparent source is located at the position from which a light beam is emitted from an output end of a laser source or waveguide connected to the laser source. The movable plate is adjusted by actuators which may be comb drives, thermal bimorphs or piezoelectric drive mechanisms.

21 Claims, 4 Drawing Sheets

MICROPOSITIONED LASER SOURCE FOR RASTER OUTPUT SCANNERS

FIELD OF THE INVENTION

The present invention relates to xerographic printers utilizing a raster output scanner, and in particular, to architectures and characteristics of laser diode arrays used in such raster output scanners.

BACKGROUND OF THE INVENTION

Raster Output Scanners (ROS) conventionally have a reflective multifaceted polygon mirror that is rotated about its central axis to repeatedly sweep one or more intensity modulated beams of light across a photosensitive recording medium in a line scanning direction (also known as the fastscan direction) while the recording medium is being advanced in an orthogonal, or "process", direction (also known as the slowscan direction) such that the beams scan the recording medium in accordance with a raster scanning pattern. Digital printing is performed by serially intensity modulating each of the beams in accordance with a binary data stream, whereby the recording medium is exposed to the image represented by the data as it is being scanned. Printers that sweep several beams simultaneously are referred to as multibeam printers. Both ROS and multibeam printer techniques are illustrated in U.S. Pat. No. 4,474,422 to Kitamura, the disclosure of which is incorporated herein by reference.

In the Kitamura patent, multiple lasers are arranged diagonally (see FIG. 10B of the Kitamura patent) to sweep multiple beams across a single photoreceptor. The beams are also displaced from each other in the cross-scan direction so that multiple lines can be scanned simultaneously across the photoreceptor. An object of the Kitamura patent is to reduce variations in pitch by spacing individual lasers within the laser array closely in a compact structure.

High speed process color and multihighlight color xerographic image output terminals require multiple independently addressable raster lines to be printed simultaneously at separate locations. This is called multistation printing.

Conventional architectures for multistation process color printers use a plurality of separate ROSs, usually four independent ROSs as illustrated in U.S. Pat. Nos. 4,847,642 and 4,903,067 to Murayama et al., the disclosures of which are incorporated herein by reference. Problems with these systems include the high cost related to the cost of multiple ROSs, the high cost of producing nearly identical multiple ROSs and the difficulty of registering system colors.

A partial solution to the problems of multistation xerographic systems with individual ROSs is disclosed in U.S. Pat. No. 4,962,312 to Matuura, the disclosure of which is incorporated herein by reference. In U.S. Pat. No. 4,962,312 a plurality of beams are overlapped using an optical beam combiner. The overlapped beams are deflected using a single polygon mirror, and are then separated using an optical filter (and polarizers if more than two beams are used). The separated beams are then directed onto associated photoreceptors. The advantage of overlapping the laser beams is a significant cost reduction since a single ROS (i.e., the polygon mirror and all associated optics) is shared by all the stations.

However an actual embodiment of the apparatus described in U.S. Pat. No. 4,962,312 would be rather complicated and expensive, especially if four system colors are to be printed. The use of optical beam combiners to overlap beams so that they have similar optical axes would be difficult, expensive and time consuming. Obtaining similar size spots on each photoreceptor would also be difficult because it would be difficult to establish the same optical path length for each beam. It would also be difficult to ensure that the latent images on the photoreceptors are properly registered. Each of these problems is at least partially related to the relative positions of the laser sources and the use of separate laser sources that are subsequently combined.

U.S. Pat. No. 5,243,359 to Fisli, the disclosure of which is incorporated herein by reference in its entirety, discloses a ROS system suitable for deflecting multiple laser beams in a multistation printer. In U.S. Pat. No. 5,243,359, the rotating polygon mirror simultaneously deflects a plurality of clustered, dissimilar wavelength laser beams having their largest divergence angles parallel to one another, that are subsequently separated by a plurality of optical filters and directed onto their associated photoreceptors. Similarly dimensioned spots are obtained on each photoreceptor by establishing similar path lengths for each beam. This is facilitated by locating all lasers in one integral unit.

The laser diodes illustrated in U.S. Pat. No. 5,243,359 are arranged in a line in a cross-scan direction i.e., parallel to the axis of rotation of the polygon mirror. See FIG. 2 of U.S. Pat. No. 5,243,359. Diodes arranged in the cross-scan direction must be fabricated such that they are packed closely together in a direction parallel to the polygon mirror rotation axis to minimize beam characteristic deviations such as spot size, energy uniformity, bow and linearity and to provide optical system magnification which in turn produces a compact optical ROS. However, locating the laser diodes close to each other introduces crosstalk. It is also difficult to fabricate such closely spaced diodes that emit light at sufficiently different wavelengths.

A partial solution to the problems encountered with this multistation printer apparatus is disclosed in U.S. Pat. No. 5,343,224, to Thomas L. Paoli, the disclosure of which is incorporated herein by reference in its entirety. U.S. Pat. No. 5,343,224 discloses a ROS system in which the rotating polygon mirror simultaneously deflects a plurality of orthogonally polarized and dissimilar wavelength laser beams having their largest divergence angles parallel to one another, that are subsequently separated by a polarized beam separator and a plurality of dichroic beam separators and directed onto their associated photoreceptors. Similarly dimensioned spots are obtained on each photoreceptor by establishing similar path lengths for each beam. This is facilitated by locating all lasers in one integral unit. However, the laser diodes illustrated in U.S. Pat. No. 5,343,224 are also arranged in a line in a cross-scan direction (i.e., parallel to the axis of rotation of the polygon mirror).

U.S. Pat. No. 5,341,158 entitled, "A Raster Output Scanner For A MultiStation Xerographic Printing System Having Laser Diodes Arranged In A Line Parallel To The Fast Scan Direction", to James J. Appel et al., the disclosure of which is incorporated herein by reference in its entirety, discloses a ROS architecture in which the laser diodes are positioned along a line that is parallel to the fast scan direction of the ROS (i.e., perpendicular to the rotation axis of the polygon mirror) and are tangentially offset in the fast scan direction.

U.S. Pat. No. 5,371,526 to Appel et al., the disclosure of which is incorporated herein by reference in its entirety, discloses a ROS system suitable for separating plural laser beams by wavelength and polarization. In the Appel patent, a plurality of laser beams having dissimilar wavelengths and dissimilar polarizations are passed through wavelength and polarization discriminating optics to alternately pass or reflect the beams that have been scanned by single polygon mirror. Polarization of the beams is accomplished via post emission polarizers, such as half wave plates.

U.S. Pat. No. 5,563,647 entitled "Method And Apparatus For Reducing Differences In Image Heights Of Images Generated By Plural Light Beams Having Dissimilar Wavelengths" to Fisli, the disclosure of which is incorporated herein by reference in its entirety, discloses a ROS system in which the image height of each of the images formed from a plurality of clustered laser beams having similar wavelengths is changed so that the image heights approximate each other. This is accomplished by passing one or more of the light beams through light transmissive plates having a predetermined thickness and index of refraction. The light transmissive plates can be optical filters that also are used to separate the clustered light beams based upon their wavelength and/or polarization. In U.S. Pat. No. 5,563,647, as well as the above referenced patents and patent applications that direct multibeams separated by a wavelength to separate photoreceptors, the beams are separated by wavelength and/or polarization by beam separators.

None of the above referenced patents or patent applications recognize or solve the problem of insuring subline registration of an image with good spot positioning by controlling laser position anywhere along a scanline. For multispot monochrome or color images having an image created by a single or several imagers for single or multipass systems, the positions of the separated color images with respect to each other are very important for noisefree combined image.

Even where a well designed system shows good spot position in theory, errors are introduced during fabrication and assembly that cause lower than predicted performance. Typical errors include misalignment of optical components in the sagittal, tangential, or axial directions, resulting in astigmatic focusing of the spots on the photoreceptor. Misalignment of the laser and optical elements relative to the axis of the optical system causes bowing of the scan line which can not be corrected across the entire scan by repositioning the beam. In addition, even when the system is correctly fabricated and assembled, inherent problems, such as photoreceptor belt conicity and process direction motion irregularities caused by thermal changes and vibrational and frictional wear and tear provide further deterioration in system performance.

Because the position of an image depends upon the position of a laser source with respect to the optical axis and the sagittal and tangential magnification of a system, optical scanners for laser printers would benefit from the ability to shift the apparent source position. This correction requires source movement of up to 10 μm transverse to the beam direction once per page. Although these sagittal and tangential magnifications are application dependent, in general the magnifications are around 6 and 30 to 50 times respectively. That is, 1 μm sagittal movement of the laser would create 6 μm sagittal image displacement, while tangentially the image would be displaced in proportions of 30 to 50 times magnification. Axial motion is beneficial during each page scan to dynamically insure the correct focus for each line scan. Thus, a small change in the position on the object plane can produce large changes in the image plane.

Page speed corrections have previously been accomplished with piezoelectric actuated mirrors external to the laser diode package. U.S. Pat. No. 4,644,160 to Arimoto et al., entitled "System for Holding Plural Light Beams in Predetermined Relative Positions", the disclosure of which is incorporated herein by reference in its entirety, discloses a system using a plurality of laser beams, in which coupling lenses for focusing beams from the diode lasers are supported by actuators. The coupling lenses are moved in a plane normal to the optical axis by the action of the actuators so that the spots are adjusted to make an accurate registration. However, thermal changes and system vibrations can affect the accuracy of parts external to the laser diode package.

U.S. Pat. No. 4,841,137 to Mochizuki et al., entitled "Beam Position Control Device", the disclosure of which is incorporated herein by reference in its entirety, discloses a beam deflector device in which two light beams from two light sources are simultaneously detected by two photo detectors used to control the position of their respective movable reflectors to a beam deflector scanning a drum. This is accomplished by passing a signal which operates actuators to move the movable reflectors to correct the position of the beams on the photo detectors. However, these actuators are external to the laser diode package and thus their accuracy is affected by thermal changes and system vibrations.

SUMMARY OF THE INVENTION

This invention therefore provides a raster output scanner for forming an image, the raster output scanner including a light emitting device emitting at least one light beam from an apparent source, a positioning device within the light emitting device for moving the apparent source and an optical system which directs the at least one light beam onto at least one image receiving location.

The positioning device may include a movable plate that supports the apparent source and actuators that move the movable plate in any of a sagittal, tangential and axial direction with reference to an optical axis of the raster output scanner. The light emitting device is connected to the movable plate. The movable plate may include micromachine fins to increase the movable plate's surface area for enhanced cooling.

According to another embodiment, the positioning device may further include a movable plate for supporting the apparent source, actuators for moving the movable plate in any of a sagittal, tangential and axial direction, a fixed plate connected to the at least one light emitting device, and a waveguide having a first end and a second end. The first end is mounted on the movable plate and proximately positioned at the apparent source. The second end is mounted on the fixed plate and proximately coupled to the at least one light emitting device.

A more complete understanding of the present invention can be obtained by considering the following detailed description in conjunction with the accompanying drawings, wherein like index numerals indicate like parts.

DETAILED DESCRIPTION OF PREFERRED EMBODIMENTS

As described in detail below, the present invention provides micromechanical positioners inside a light emitting apparatus that adjust an apparent source location in scanner assemblies. The apparent source location is adjusted to enable spot position control anywhere along the scanline to insure subline registration of the image and correct for (1) image curvature, i.e., position of the beam focus position, by adjusting the axial position of the apparent source, (2) bow of the scan line in the sagittal direction by adjusting the sagittal position of the apparent source, and (3) nonlinearity of the scan positions by adjusting the tangential position of the apparent source at a constant pixel clock rate. The "apparent source location" is defined as the position from which a light beam is emitted from an output end of a laser source or from a waveguide connected to the laser source. In addition, differential bow encountered in multiple spot scanning with a single polygon can be minimized by rotating the multiple laser source in order to change the apparent sagittal separation of the lasers.

Figure 1:
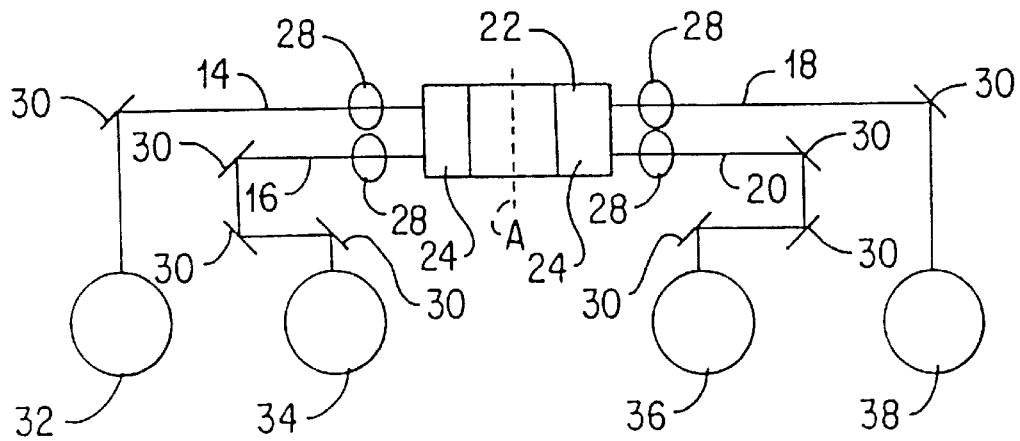
FIG. 1 is a simplified, schematic view of a first multistation raster output scanner (ROS) system that is usable with the present invention.
Figure 2:
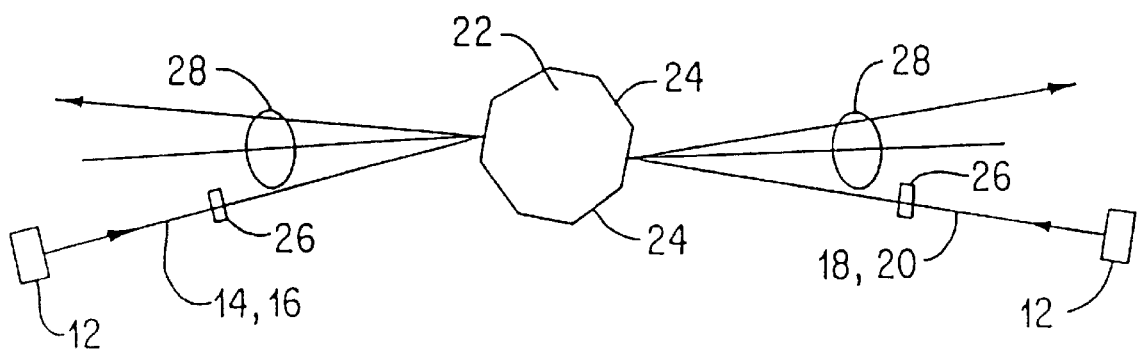
FIG. 2 is a prospective, schematic view illustrating the orientation of the laser sources, beam input and imaging optics and the rotating polygon mirror in FIG. 1.

As illustrated in FIGS. 1 and 2, an embodiment of the invention has a plurality of light source devices 12 that output four separate light beams 14, 16, 18 and 20. While it appears that there are only two light source devices 12 in FIG. 2 there are actually four such light source devices 12, which are sagitally displaced (displaced parallel to the axis of rotation A of polygon 22). Thus, only two of the four light source devices 12 are visible in FIG. 2. Similarly, the light beams 14 and 16 and the light beams 18 and 20 are sagitally displaced and thus appear as a single light beam in FIG. 2.

Each of the light beams 14, 16, 18 and 20 are directed through separate input optics 26, which direct the beams 14, 16, 18 and 20 to the rotating polygon 22. Thus, in this embodiment, four separate input optical channels direct each of the light beams 14, 16, 18 and 20 to appropriate facets 24 of the polygon 22. Each of the input optical channels includes at least one light beam which passes through a single input optics 26. Thus, the raster output scanning system of the embodiment shown in FIGS. 1 and 2 has four input optical channels which are sagitally separated.

The light beams 14, 16, 18 and 20 are deflected by the rotating polygon 22 through imaging and correction optics 28, which focuses the beams and corrects for errors such as polygon angle error and wobble. Each of the light beams 14, 16, 18 and 20 are then reflected by mirrors 30 and are scanned across image receiving locations 32, 34, 36 and 38 to form images on the image receiving locations. The mirrors 30 are positioned to equalize an optical path length of each of the light beams 14, 16, 18 and 20. An optical output channel includes at least one light beam and a single imaging and correction optics 28. Thus, the system shown in FIGS. 1 and 2 has four output optical channels with one of the light beams 14, 16, 18 and 20 output through each of the output optical channels.

Each of the light beams 14, 16, 18 and 20 when scanned across image receiving locations 32, 34, 36 and 38 forms an image of one of a plurality of different colors. Each of the images is transferred from the image receiving locations 32, 34, 36, and 38 onto a transfer medium (now shown) such as a sheet of paper, to form a color image thereon. Thus, the ROS system of the invention produces a four color image utilizing a plurality of input optical channels that direct light beams to separate facets of a rotating polygon with a single pass of the recording medium past the image receiving locations.

Figure 3:
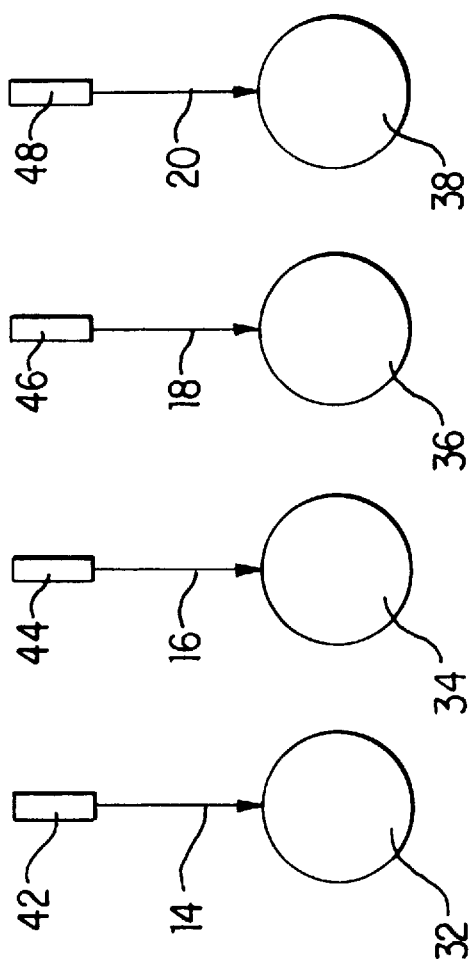
FIG. 3 is a simplified, schematic view of a second multistation ROS system that is usable with the present invention.

FIG. 3 schematically illustrates another multistation ROS system that is usable with the present invention which includes four independent ROSs 42, 44, 46 and 48. Each ROS 42, 44, 46 and 48 outputs a separate light beam 14, 16, 18 and 20 to a respective photoreceptor 32, 34, 36 and 38. In other words, FIG. 3 uses one independent ROS 42, 44, 46 and 48 for each photoreceptor 32, 34, 36 and 38. Each ROS 42, 44, 46 and 48 uses the positioning apparatus of the present invention.

Figure 4:
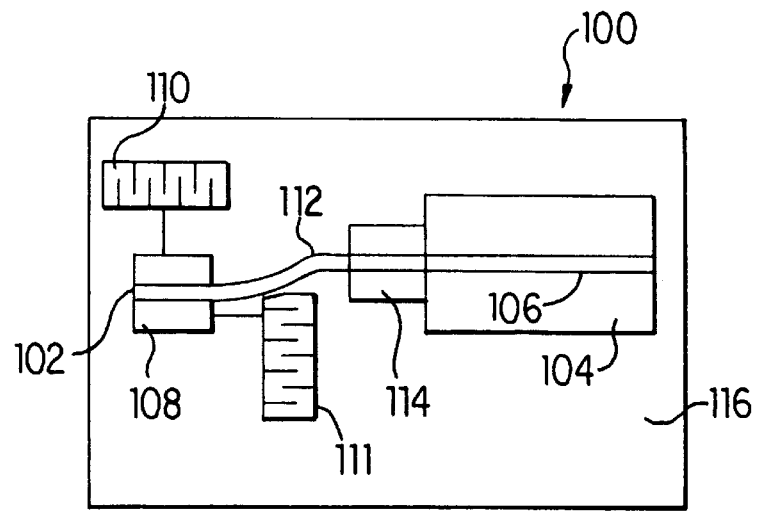
FIG. 4 illustrates a first embodiment that moves the position of the apparent source using a movable plate and a fixed plate.

FIG. 4 shows a first approach to adjusting the position of the apparent source inside the light emitting device. In this embodiment, a light emitting device 100 includes an apparent source 102, a laser source 104 having a laser stripe 106, a freeplate 108, actuators 110, 111, a fiber waveguide 112, a fixed plate 114 and a substrate 116. The laser source 104 is mounted on either the fixed plate 114, the substrate 116 or a support mount (not shown) that is attached to the substrate 116.

Light from the light source 104 is coupled into a flexible waveguide 112. The waveguide 112 may be made from, for example, fiber or thin film. One end of the flexible waveguide 112 is mounted on the fixed plate 114 and proximately coupled to the laser stripe 106. The other end of the flexible waveguide 112 is mounted on a movable plate 108. In this embodiment, the apparent source 102 is located at the position from which a light beam is emitted from the end of the flexible waveguide 112 that is mounted on the movable plate 108.

Movable plate 108 is connected to actuators 110, 111. The actuators 110, 111 adjust the movable plate 108 in a direction corresponding to the relative position of each actuator 110, 111 to the moveable plate 108. In FIG. 3, actuator 110 adjusts movable plate 108 in a sagittal direction and actuator 111 adjusts moveable plate 108 in a axial direction. Additional actuators (not shown) could be placed in additional directions to adjust the movable plate 108 in other directions. For example, an actuator could be placed at a location perpendicular to the plane of movable plate 108 and actuators 110 and 111 to adjust the movable plate 108 in a tangential direction. The amount of movement needed is determined by position errors at the photoreceptor and the sagittal and tangential magnifications of the optical system.

Each actuator could be, for example, a comb drive, a thermal bimorph or a piezoelectric drive mechanism, depending on the type of actuator selected. Electrostatic control through the application of a voltage can be used with comb-drive or piezoelectric drive mechanisms. Thermal control through the application of a current is issued to control a thermal bimorph. The total amount of deflection possible is a function of which actuator is selected and the size of that actuator. U.S. Pat. No. 5,025,346, to Tang et al., the disclosure of which is incorporated herein by reference in its entirety, describes the features of the comb-drive displacement. Tang discloses a lateral-drive approach, wherein a mechanical structure (i.e., a movable plate) can be driven parallel to the substrate 116 by a linear comb drive.

Comb drives typically have resonances in excess of about 10 kilohertz, so the use of comb drives as the actuators 110 would enable modulation of the apparent source position at kilohertz rates. Comb drives would also be beneficial because displacements of moving plates up to several hundred micrometers have been demonstrated with the use of comb drives. This displacement is sufficient for the embodiments of this invention.

In order to insure that the movable plate is able to freely move with a minimum of static friction, the surfaces of the plate should be rough at a microscopic level. It is well known that microscopically smooth surfaces tend to stick. Although roughening the surface will increase dynamic friction, it will decrease static friction and therefore prevent sticking between the movable plate and the substrate.

Methods exist to ensure a microscopically rough surface, including, for example, polysilicon texturing or lithographic patterning. Polysilicon is grown by chemical vapor deposition and forms a microscopically rough surface that has no sticking problems. In addition, lithographic patterning and etching of smooth surfaces can roughen the surface at a microscopic level. Otherwise, a chemical treatment of the smooth surfaces is possible as described in U.S. Pat. No. 5,403,665, to Alley et al., the disclosure of which is incorporated herein by reference in its entirety, wherein a micromachine is lubricated in a fluid-based process. These methods prevent the movable plate from sticking firmly to the substrate.

Figure 5:
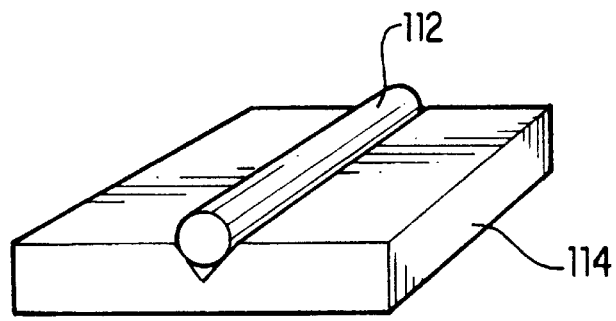
FIG. 5 illustrates a fiber waveguide and fixed plate in accordance with the first embodiment of the invention.

The movable plate 108 and fixed plate 114 may be made from silicon on insulator (SOI) wafers. A bonding pad (not shown) for the light emitting device can be etched into the silicon substrate according to current silicon "optical bench" technology. In addition, the flexible waveguide 112 may be made from fiber, and an isotropic etching can be used to create V-grooves for aligning the fiber waveguide 112 in the plates as illustrated in FIG. 5, which discloses an example of fiber waveguide 112 aligned in the fixed plate 114 V-groove. This embodiment has the advantage that relatively efficient heat sinking of the light emitting device is obtained through the silicon substrate. Reflections produced from the optical fiber can be controlled by, for example, including the distance between the laser facet and the input surface of the optical fiber in the laser cavity.

Although FIG. 4 uses a single light emitting device array, this embodiment may use multiple light emitting device arrays. If the elements are close together, the light beams may be transmitted by one waveguide. If the elements are not close together, then separate waveguides may be required for distant elements, as shown above in FIGS. 1 and 2. If desired, a wave guide combiner (not shown) may be used to join multiple waveguides into one waveguide.

Figure 6:
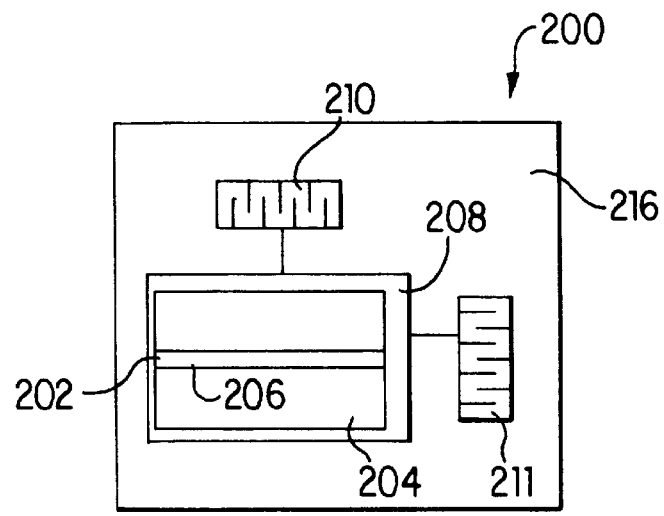
FIG. 6 illustrates a second embodiment that moves the position of the apparent source on a movable plate.

FIG. 6 illustrates another embodiment of the invention, wherein the light emitting apparatus 200 includes an apparent source 202, a laser source 204 having a laser stripe 206, a movable plate 208, actuators 210, 211 and a substrate 216. The apparent source 202 is located at the output end of the laser stripe 206. Laser source 204 is mounted on movable plate 208.

As discussed above regarding FIG. 4, the actuators 210, 211 of FIG. 6 adjust movable plate 208 in sagittal and axial directions. An actuator (not shown) could also be placed at a location perpendicular to movable plate 208 and both actuators 210 and 211 to adjust movable plate 208 in a tangential direction. The movable plate 208 is connected to actuators 210, 211, which may be, for example, comb drives, thermal bimorphs or piezoelectric drive mechanisms. Actuators 210, 211 move the movable plate 208 which adjusts the position of the apparent source 202 to insure correct spot positioning and beam focus of the image at all positions of the scan, as discussed above regarding the FIG. 4 embodiment.

Although this approach is more direct than the first approach, heat sinking of the laser source 204 is more difficult because the plate 208 is movable and therefore can not be as thermally coupled to the base plate of apparatus 200. However, the light emitting device may be further cooled by conduction or convection through a gaseous ambient in the light emitting apparatus 200.

The gaseous ambient in the package can be any inert gas such as nitrogen, or argon and is used to enhance the removal of heat from the laser chip. The advantage of this approach is that there is no intermediate element between the laser source and the output, thereby eliminating problems of coupling and alignment. In particular the elimination of the optical fiber avoids optical reflections that may disturb the performance of the light emitting device.

Figure 7:
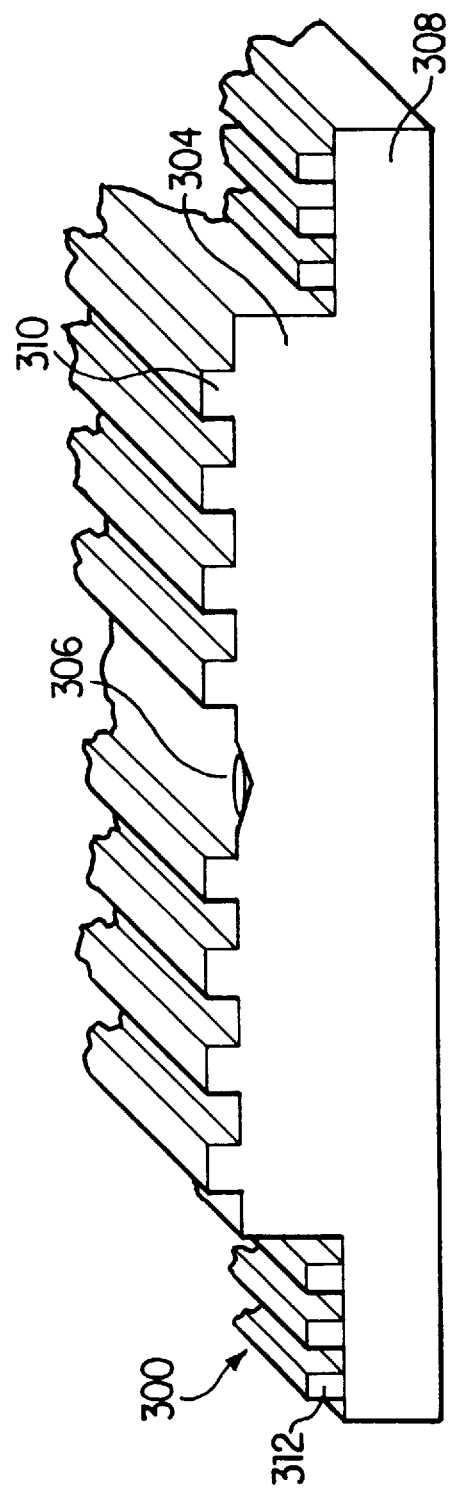
FIG. 7 is a schematic view illustrating the orientation of micromachine fins on a laser source and either a movable or a fixed plate in accordance with the first or second embodiments of the invention.

It is also possible to micromachine fins on the light emitting devices 100 and 200, as shown in FIG. 7, to increase its surface area for enhanced conduction to a gaseous ambient in the package. In FIG. 7, the light emitting device 300 includes a laser source 304, an exposed laser stripe 306, a fixed, or movable plate 308, and cooling fins 310 and 312. Cooling fins 310 and 312 can be micromachined on the laser source 304 and on the fixed or movable plate 308.

While this invention is described in detail herein, with specific reference to certain illustrative embodiments, it is to be understood that there is no intent to be limited to these embodiments. On the contrary, the aim is to cover all modifications, alternatives and equivalents falling within the spirit and scope of the invention as defined by the claims. For example, the invention is applicable to all types of printing devices that use light beams to form images. Such printing devices include facsimile machines, copiers, printers, etc. Although the illustrative printing devices used four light beams, the invention is applicable to printing devices having one or more light beams. In addition, although the illustrated printing devices use one apparent light beam source on one movable plate, the invention is applicable to any device having one or more apparent light beam sources on any number of movable plates. The illustrated embodiments direct each light beam to an imaging surface that may be a separate photoconductive drum. However, the invention also is applicable to printing devices that use multiple imaging surfaces to receive one or more scanned light beams. For example, a single photoreceptor belt could receive each of four light beams at a different location. Typically in such a system the light beams would be directed to different locations on the single imaging surface, although it is possible to direct each light beam to the same location. The main feature is that each beam forms its own distinct image, which needs to properly match with the images formed by the other light beams.

What is claimed is:

1. A raster output scanner for forming an image, comprising:

a substrate;

a light emitting apparatus attached to the substrate that emits at least one light beam from an apparent source location;

a positioning device within the light emitting apparatus for moving the apparent source location, wherein the apparent source location moves on the substrate with reduced static friction; and an optical system which directs the at least one light beam onto at least one image receiving location.

2. The raster output scanner of claim 1, wherein the positioning device comprises:

first support means for supporting the apparent source location; and actuating means for moving the first support means in at least one of a sagittal, tangential and axial direction.

3. The raster output scanner of claim 2, wherein the light emitting apparatus includes a laser source.

4. The raster output scanner of claim 3, wherein the laser source is connected to the first support means.

5. The raster output scanner of claim 4, wherein the first support means includes at least one fin for increasing a surface area of the first support means.

6. The raster output scanner of claim 3, wherein the positioning device further comprises:

second support means connected to the laser source; and a waveguide having a first end and a second end, the first end mounted on the first support means and positioned at the apparent source location, the second end mounted on the second support means and coupled to the laser source.

7. The raster output scanner of claim 6, wherein the waveguide is made of one of fiber and thin film.

8. The raster output scanner of claim 6 wherein the first support means includes a first base and the second support means includes a second base, the first base having a microscopically rough surface so that the first support means moves with minimal friction.

9. The raster output scanner of claim 8, wherein at least one of the first base and second base is made from a compound including silicon.

10. The raster output scanner of claim 9, wherein at least one of the first base and the second base includes grooves for aligning the waveguide.

11. The raster output scanner of claim 10, wherein an interface between the laser source and the second end of the waveguide is optically matched.

12. The raster output scanner of claim 11, further comprising a gaseous ambient for cooling the laser source.

13. The raster output scanner of claim 8, wherein the microscopically smooth surface is formed by at least one of oxide texturing and lithographic striations.

14. The raster output scanner of claim 3, wherein the positioning device further comprises:

second support means connected to the laser source;

a waveguide having a first end and a second end, the first end mounted on the first support means and positioned at the apparent source location, the second end coupled to the laser source, wherein the laser source is mounted on one of the second support means and the substrate.

15. The raster output scanner of claim 14, wherein the waveguide is made of one of fiber and thin film.

16. The raster output scanner of claim 14, wherein the first support means includes a first base and the second support means includes a second base, the first base having a microscopically rough surface so that the first support means moves with minimal friction.

17. The raster output scanner of claim 14, wherein at least one of the second support means and the laser source includes at least one fin for increasing a surface area of the one of the second support means and the laser source.

18. The raster output scanner of claim 2, wherein the actuating means includes at least one of comb drives, thermal bimorphs and piezoelectric drive mechanisms.

19. The raster output scanner of claim 1, wherein the positioning device moves the apparent source during formation of the image.

20. A method of forming an image with a raster output scanner, comprising:

emitting at least one light beam from an apparent source location of a light emitting apparatus connected to a substrate;

moving the apparent source location with a positioning device within the light emitting apparatus in at least one of a sagittal, tangential and axial direction on the substrate with minimal friction therebetween; and directing the at least one light beam onto at least one image receiving location with an optical system.

21. The method of forming an image of claim 20, wherein the apparent source location is moved during formation of the image.

* * * * *